Jan. 9, 1940.  J. W. SMITH  2,186,216
APPARATUS FOR SPRAYING LIQUID FUEL INTO A COMBUSTION
CHAMBER HAVING THE REQUIRED TURBULENCE
Filed Feb. 4, 1935
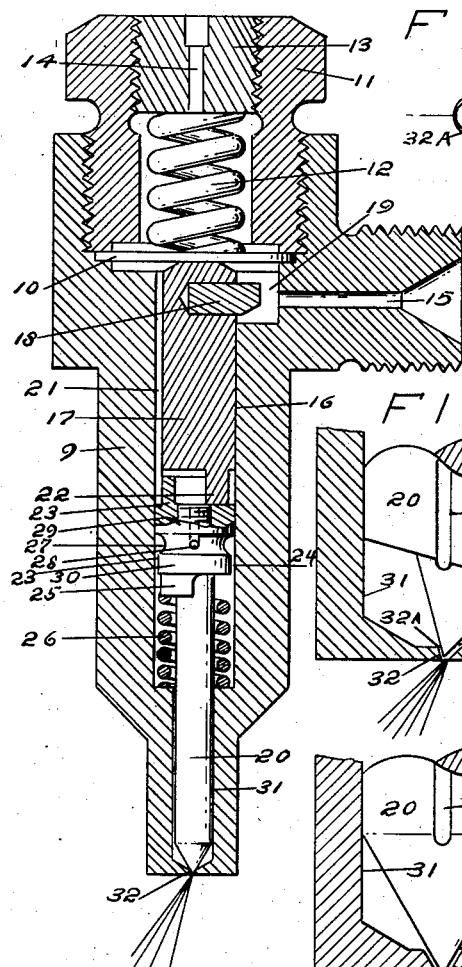
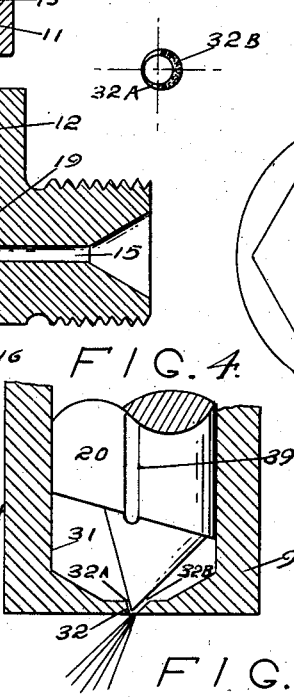
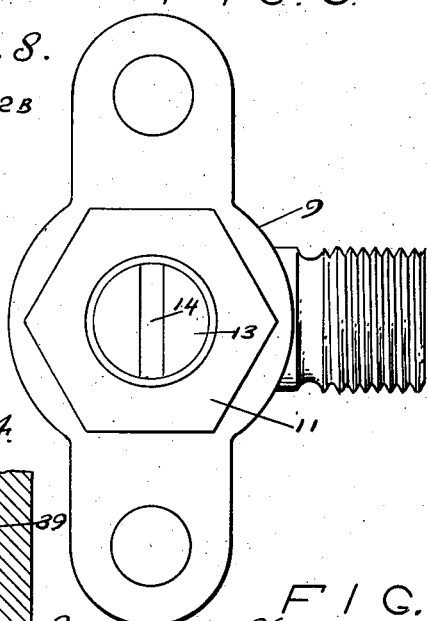
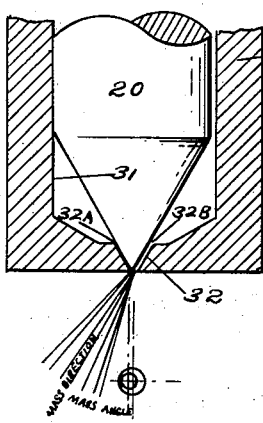
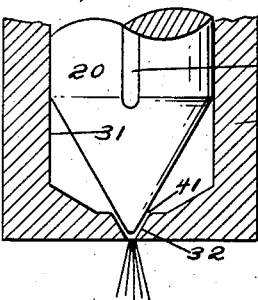
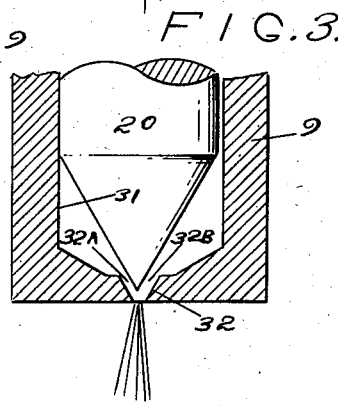
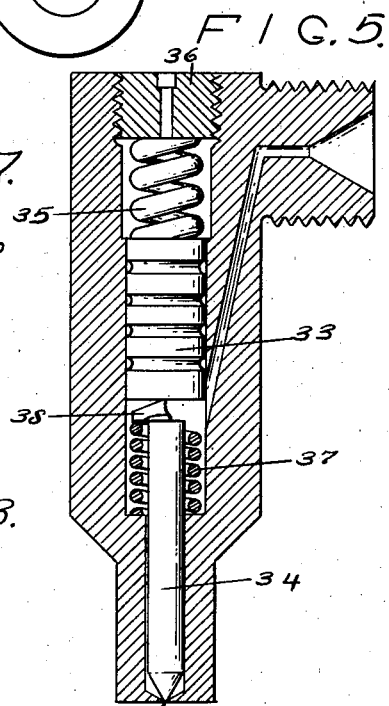
INVENTOR
John W. Smith
BY
Herbert S. Fairbanks
ATTORNEY Patented Jan. 9, 1940

2,186,216

UNITED STATES PATENT OFFICE 2,186,216

APPARATUS FOR SPRAYING LIQUID FUEL INTO A COMBUSTION CHAMBER HAVING THE REQUIRED TURBULENCE

John W. Smith, Overbrook Manor, Pa.

Application February 4, 1935, Serial No. 4,746

3 Claims. (Cl. 299—107.5)

This invention relates to an apparatus for spraying liquid fuel into a combustion chamber having the required turbulence.

The efficient operation of the compression ignition engine depends on maintaining the required period for injection for each working stroke throughout the entire speed range from 200 R. P. M. to 3600 R. P. M. Heretofore, the efficient operation of the fuel injection engine has been confined to a speed range from 600 R. P. M. to 1800 R. P. M. which represents a three to one speed range.

A normal period for fuel injection is 20° of crank shaft rotation.

It is not practical to increase the pressure to maintain a 20° injection period throughout the speed range. Three thousand pounds per square inch may be considered a normal pressure for injection. To maintain with a fixed area orifice a 20° period for injection at 1900 R. P. M. would require an impracticable injection pressure of twenty seven thousand pounds per square inch. Therefore, any of the conventional forms of fixed area orifice or fixed number of holes in a nozzle would result in injection lag at a speed of 1800 R. P. M. and at 600 R. P. M. an excess of fuel would be injected to get penetration.

My apparatus for fuel injection eliminates injection lag throughout the entire speed range of 18 to 1, and maintains, throughout the entire speed range, correct penetration.

With the foregoing in view, my invention comprehends a novel apparatus for injecting and atomizing liquid fuel into the combustion chamber with the required amount of penetration, and proper atomization for the entire range of engine speed.

It further comprehends a novel apparatus for forcing a predetermined quantity of liquid through an orifice, controlling the effective area of the orifice by the injection pressure, and controlling the atomization and penetration by the effective area of the orifice and the angle of convergence.

Other novel features of construction and advantage will hereinafter appear in the detailed description and the appended claims.

For the purpose of illustrating the invention, I have shown in the accompanying drawing typical embodiments of it, which, in practice, will give satisfactory and reliable results. It is, however, to be understood that the various instrumentalities of which my invention consists can be variously arranged and organized, and my invention is not limited to the exact arrangement and organization of these instrumentalities as herein set forth.

Figure 1 is a sectional elevation of a spray valve embodying my invention and by the use of which my method of spraying liquid fuel can be carried out in practice.

Figure 2 is a sectional elevation, on an enlarged scale, showing the valve stem of Figure 1 as having been withdrawn a substantial amount but still controlling the direction of the spray.

Figure 3 is a sectional elevation, on an enlarged scale, showing the valve stem of Figure 1 as withdrawn to its limit to provide a maximum area of orifice and having no influence on the direction of spray.

Figure 4 is a sectional elevation, on an enlarged scale, of another embodiment of my invention.

Figure 5 is a sectional elevation of another embodiment of my invention in which a piston is employed to hydraulically operate the valve stem.

Figure 6 is a top plan view of the spray valve seen in Figure 1.

Figure 7 is a sectional elevation, on an enlarged scale, of another embodiment of my invention in which the variable area orifice has a fixed lineal direction of spray.

Figure 8 is a detail, on an enlarged scale, to illustrate more clearly the phenomenon of spraying at an angle by considering the mass zone.

Similar numerals indicate corresponding parts.

Referring to the drawing:

Heretofore the valve stem was seated at a remote distance from the mouth of the orifice. This condition has been referred to in the specifications as a fixed area orifice.

The variable area orifice is the subject matter of this invention.

The variable area orifice requires the valve stem to extend to the mouth of the orifice, or it may protrude through the mouth of the orifice into the combustion chamber.

The degree of variation in effective orifice area is established by the amount of taper 32, in Figures 1, 2, 3 and 7, that is, if the orifice has parallel sides the effective area would be unaffected, and there would be no increase in effective area if a cylindrical valve stem was withdrawn.

A normal taper is 30° from the center line as illustrated by 32, in Figures 1, 2, 3 and 7.

The size of the orifice at the small end is about .015 of an inch for 40 cubic inch displacement engine.

9 designates the valve housing which is recessed at its outer end to receive a diaphragm 10 secured in place by a plug 11 in threaded engagement with the valve housing. The diaphragm 10 is loaded by a spring 12 and the correct tension is applied by an adjusting nut 13 which has a passage 14 through it. The diaphragm 10 is capable of being flexed by the liquid fuel admitted under pressure to the fuel inlet passage 15.

The valve housing has a bore 16 to receive a plunger 17. The plunger 17 has a guide pin 18 extending into a recess 19 in the housing to prevent the valve stem 20 from altering the direction of the spray in respect to the valve housing 9. The plunger 17 has a fuel passage 21, and a forwardly extending shoulder 22. This shoulder bears against the enlarged end 23 of the valve stem. The end 23 has a shoulder 25 against which a spring 26 exerts a pressure, forcing the valve stem to eject the spray in a predetermined direction.

The end 23 of the valve stem has an annular groove 27 through which the fuel passage 28 opens. The end 23 has a portion 29 having a working fit in the bore 16 and a portion 30 which is of less diameter than that of the bore to function as a strainer.

The space 24 between the portion 30 and the walls of the bore 16 may be one thousandth of an inch or less.

The valve stem 20 extends into the bore 31 and terminates in a forwardly converging valve seat 32 to cooperate with the cone shaped end of the valve stem.

In the embodiment seen in Figure 5, a spring loaded piston 33, corresponds to the spring loaded diaphragm in Figure 1, and hydraulically controls the valve stem 34 when the required pressure on the liquid fuel is reached. A spring 35 is positioned between the piston and an adjusting nut 36. A spring has no dynamic force to compress itself. The dynamic force is hydrostatic. The spring 35, in Figure 5, is used to prevent the piston 33 from moving until a hydrostatic normal pressure of 3000 lbs. per square inch is reached. The spring 35 was compressed by hydrostatic pressure, therefore the potential energy in the spring to return the piston 33 is hydrostatic. A spring 37 retains the shoulder 38 of the valve stem 34 against the piston, and this shoulder controls the direction of the spray. The off-center relation as shown in Figure 8 between the housing and piston determines the direction of the whipping spray, and enough clearance is provided between the housing and valve to permit this spray phenomena.

The valve stem 20 in Figure 2 has been withdrawn a substantial amount from valve seat 32 but still controls the direction of spray.

If the valve stem 20 is withdrawn to its limit as seen in Figure 3 the orifice will reach its maximum area and the valve stem will not have any influence on the direction of spray.

The size and angle of the orifice can be proportioned to cause a variation of spray angle from that shown in Figure 2 to that shown in Figure 3.

The variable area orifice may be designed to have a fixed lineal direction of spray by employing a neat fit between the valve stem and the housing as in Figure 7.

The valve stem may have a neat fit in the housing and spray at an angle by preparing the valve seat and valve at an angle as in Figure 4.

In some cases the bore in the housing is less than .002 of an inch larger than the valve stem, and the required spray angle is maintained as in Figures 1 and 2. In a valve of this kind, the whipping to and fro in action produces a whipping spray once the direction is determined, and the valve can be positioned as desired on the combustion chamber.

The use of a converging valve seat 32 as an orifice produces spray phenomena as to direction of spray, atomization and penetration.

The predominating mass zone 32B is dotted in Figure 8, and the secondary mass zone 32A is not dotted.

The large fuel mass 32B will determine the direction of spray as in Figure 2 by predominating over the smaller fuel mass 32A.

Special means are provided as disclosed for the purpose of predetermining the direction of the spray relatively to the housing.

The phenomena of spraying at an angle is illustrated in Figures 2 and 8 to enable a clearer understanding of the mass zone.

A very thin film of liquid fuel around the entire circumference of the valve stem is forced to converge into one stream. A 30° angle of convergence will highly atomize the fuel. The predominating fuel mass zone 32B will predominate over the small fuel mass zone 32A which is emerging from the opposite side and the resultant will be a spray angle conforming to the spray angle shown in Figures 2, 4, and 5.

In Figure 4, the valve stem has a fuel passage 39, and in Figure 7, the valve stem has a fuel passage 40.

In Figure 7, the cone shaped end of the valve stem is flat instead of pointed, and the mass zone 41 is concentric.

The size of the orifice may be so proportioned that during each period of injection at high speed, the spray will whip from the position shown in Figure 2 to that shown in Figure 3 during the period of valve opening, and during the period of valve closing the spray will whip from the position shown in Figure 3 to that shown in Figure 2.

This feature is very important when operating the engine at high speed.

This feature produces a better effect than a multiple orifice, due to the fact that the spray is more finely atomized and covers the area between the angles shown in Figures 2 and 3.

The angle of the spray can be increased by increasing the angle of divergence of the valve seat 32.

Having thus described my invention what I claim as new and desire to secure by Letters Patent is:

1. In a spray valve, a housing having a discharge orifice converging in the direction of flow, a valve stem controlling said orifice, and a spring loaded member acted upon by the injection pressure and effective to position the valve off-center in its orifice to control the direction of spray.

2. In a spray valve, a housing having a discharge orifice converging in the direction of flow, a valve stem controlling said orifice and having an off-center shoulder, a spring loaded member bearing against said shoulder and acted on by injection pressure, and a spring acting against said shoulder.

3. In a spray valve, a housing having a discharge orifice converging in the direction of flow, a valve stem controlling the area of said orifice, a spring loaded member acted on by injection pressure and having an off center bearing against an end of said valve stem, and a spring tending to move the valve stem towards said member.

JOHN W. SMITH.